W. PRELLWITZ.
HAMMER DRILL.
APPLICATION FILED FEB. 15, 1909.
975,891.
Patented Nov. 15, 1910.
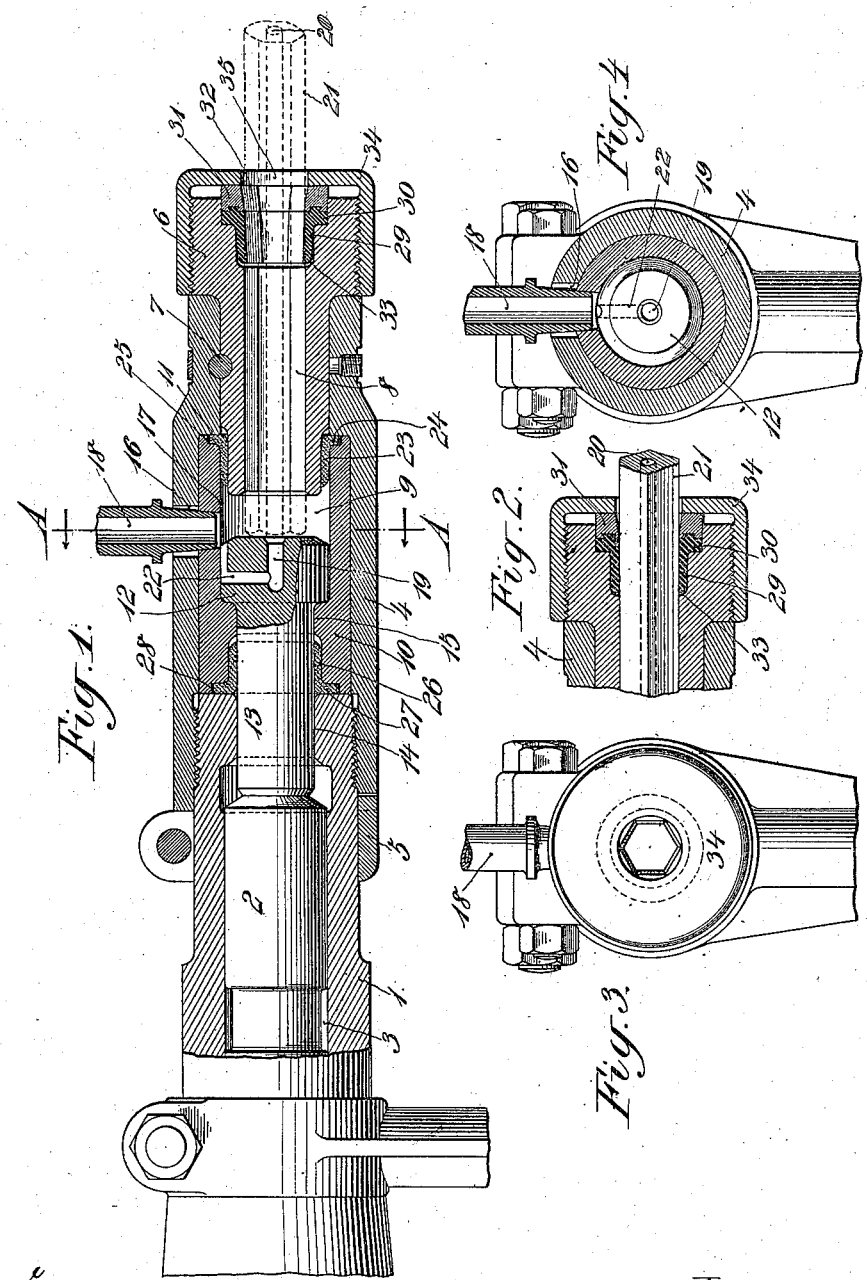

UNITED STATES PATENT OFFICE.

WILLIAM PRELLWITZ, OF EASTON, PENNSYLVANIA, ASSIGNOR TO INGERSOLL-RAND COMPANY, OF NEW YORK, N. Y., A CORPORATION OF NEW JERSEY.

HAMMER-DRILL.

975,891.  Specification of Letters Patent.  Patented Nov. 15, 1910.

Application filed February 15, 1909. Serial No. 478,112.

*To all whom it may concern:*

Be it known that I, WILLIAM PRELLWITZ, a citizen of the United States, and resident of Easton, in the county of Northampton and State of Pennsylvania, have invented a new and useful Improvement in Hammer-Drills, of which the following is a specification.

This invention relates to hammer drills and has for its object to provide a novel construction at the front end of the drill which will be particularly well adapted for feeding fluid under pressure to a hollow drill steel of common form, fluid-tight connections being provided for the pressure fluid feeding chamber and also between the drill steel and its chuck.

In the accompanying drawings, Figure 1 represents the front end of a hammer drill embodying the invention, the parts being shown partially in side elevation and partially in longitudinal central section; the drill steel being shown in dotted lines in its operative position, Fig. 2 is a detail longitudinal central section at the front end of the drill showing the drill steel in full lines in its position within its chuck, Fig. 3 is a front end view of the drill with the drill steel removed and a portion of the handle broken away, and Fig. 4 is a transverse section taken in the plane of the line A—A of Fig. 1, looking in the direction of the arrows.

The hammer drill cylinder is denoted by 1. It is provided with the usual piston hammer 2 which is fitted to reciprocate in the cylinder chamber 3. The hollow front head 4 is rigidly secured to the front end of the cylinder 1, as, for instance, by being screwed thereon and locked against movement by a clamp ring 5.

The drill steel receiving chuck is denoted by 6, which chuck extends inwardly through the outer end of the front head 4 and it is locked to the front head by any suitable means, such, for instance, as by a cross pin 7. The socket 8 in the chuck for the drill steel extends entirely through the chuck and opens into a pressure fluid feeding chamber 9 within a tube 10 interposed between the front end of the cylinder 1 and an inner shoulder 11 of the front head located a short distance beyond the inner end of the chuck 6.

The head 12 of the anvil block is located within the pressure fluid feeding chamber 9 and its shank 13 extends rearwardly through the tube 10 and reduced front end 14 of the cylinder 1 into the chamber 3 in position to be struck by the hammer piston 2. This tube 10 is provided with an interior annular rib 15 which forms a shoulder against which the inner end of the head 12 of the anvil block abuts.

The front head 4 is provided with a transverse hole 16 in alinement with a transverse hole 17 in the tube 10 for permitting the attachment of a pressure fluid supply pipe 18 for feeding the pressure fluid to the chamber 9.

The head 12 of the anvil block is provided with an axially arranged duct 19 opening through its front end in alinement with the bore 20 of the hollow drill steel 21, which duct 19 is in open communication with the chamber 9 at all times through a branch duct 22.

A cup washer 23 is interposed between the tube 10 and the inner end of the chuck 6 to form a fluid tight packing at this point, the circumferential flange 24 of which washer is seated in an annular recess 25 in the front end of the tube 10. A cup washer 26 is interposed between the tube 10 and the shank 13 of the anvil block to form a fluid tight packing at this point, the circumferential flange 27 of which washer being seated in an annular recess 28 in the inner end of the tube 10.

A fluid tight packing is formed between the drill steel and its chuck at the outer end of the chuck, as follows:—An elastic cup shaped washer 29 has a normally contracted bore of the same cross sectional shape as the drill steel and the socket of the chuck, the circumferential flange 30 of which cup washer is secured to a rigid protecting ring 31, which protecting ring is provided with a flaring bore 32 of the same cross sectional form as the drill steel.

The normally contracted bore of the elastic cup washer 29 is preferably formed by tapering the bore from the front to the rear end of the washer. This cup washer 29 and a portion of its protecting ring 31, are seated in a stepped recess 33 in the outer end of the chuck 6 and are removably held in such position in the present instance by providing a screw cap 34 having a central hole 35 for the reception of the drill steel.

It will be seen that by providing a construction as here shown and described. the pressure fluid feeding chamber 9 is rendered fluid tight and also that a fluid tight connection is provided between the drill steel and its chuck. Furthermore, it will be seen that the parts may be very quickly assembled and disassembled for permitting the renewal of the packings or other parts and also that the device is applicable for use in connection with the common form of drill steel.

By providing the elastic cup washer at the mouth of the chuck with a protecting ring of rigid material, it will be seen that the washer is protected from injury when the drill steel is inserted into the chuck.

The packing shown and described but not claimed specifically herein, forms the subject matter of a copending application filed by me June 15, 1909, Serial No. 502254.

What I claim is:—

1. In a hammer drill, a front head having a pressure fluid chamber therein, a chuck secured to the front head, a hollow drill steel in open communication with said chamber, an elastic washer seated in the chuck forming a fluid-tight joint around the drill steel and a washer forming a fluid-tight joint around the chuck.

2. In a hammer drill, a front head having a pressure fluid chamber therein, a chuck secured to the front head, an anvil block, a hollow drill steel in open communication with said chamber and washers forming fluid-tight joints around the chuck and the anvil block.

3. In a hammer drill, a front head having a pressure fluid chamber therein, a chuck secured to the front head, an anvil block, a hollow drill steel in open communication with said chamber, washers forming fluid-tight joints around the chuck and the anvil block, and an elastic washer seated in the chuck forming a fluid-tight joint around the drill steel.

4. In a hammer drill, a tube having a pressure fluid feeding chamber therein, a front head inclosing the tube, a chuck secured to the front head and having its rear end extended into said chamber, a washer forming a fluid-tight joint between the chuck and the front end of the tube, an anvil block, a washer forming a fluid-tight joint between the anvil block and the inner end of the tube and a hollow drill steel in open communication with said chamber.

5. In a hammer drill, a tube having a pressure fluid feeding chamber therein, a front head inclosing the tube, a chuck secured to the front head and having its rear end extended into said chamber, a washer forming a fluid-tight joint between the chuck and the front end of the tube, an anvil block, a washer forming a fluid-tight joint between the anvil block and the inner end of the tube, a hollow drill steel in open communication with said chamber, and an elastic washer seated in the front end of the chuck forming a fluid-tight joint around the drill steel.

In testimony, that I claim the foregoing as my invention, I have signed my name in presence of two witnesses, this thirteenth day of February, 1909.

WILLIAM PRELLWITZ.

Witnesses:
F. GEORGE BARRY,
HENRY THIEME.